Figure 4:
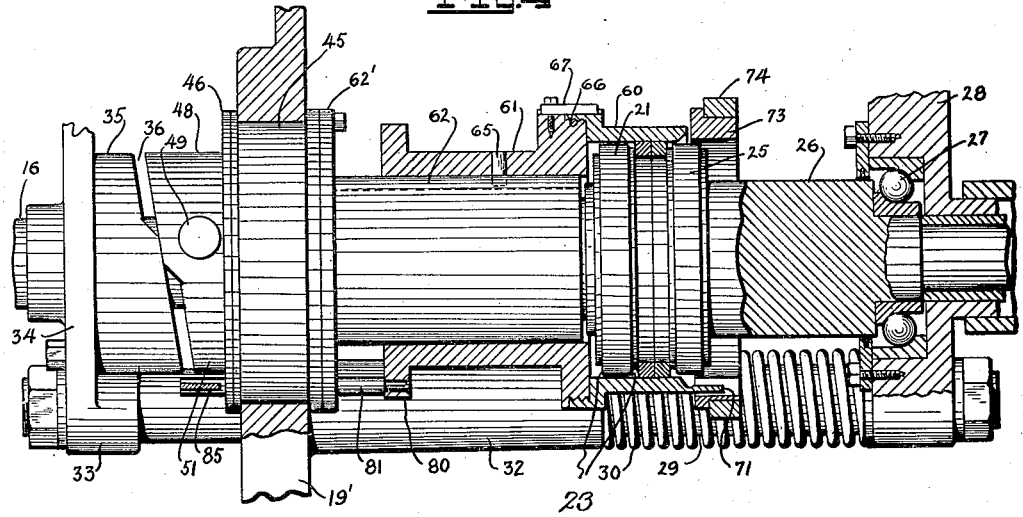

June 19, 1928.
C. D. HELLYER
1,674,286
CENTERING AND HOLDING DEVICE FOR METAL WORKING MACHINES
Filed Feb. 5, 1925
3 Sheets-Sheet 1
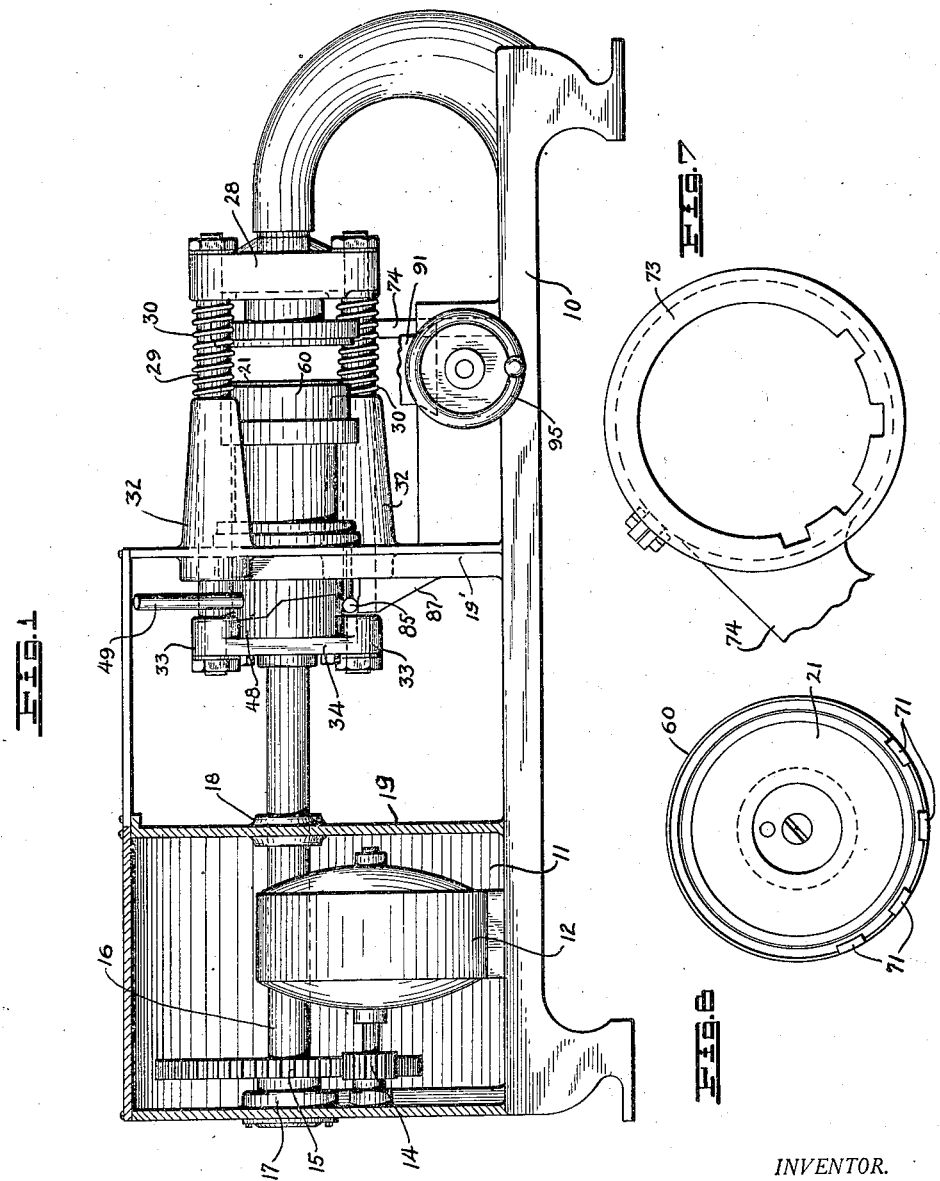
INVENTOR.
C.D. HELLYER
BY
ATTORNEY June 19, 1928.
C. D. HELLYER
1,674,286
CENTERING AND HOLDING DEVICE FOR METAL WORKING MACHINES
Filed Feb. 5, 1925   3 Sheets-Sheet 2
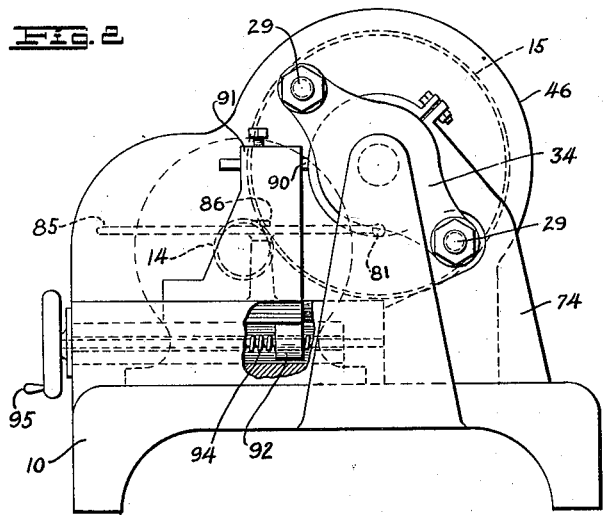
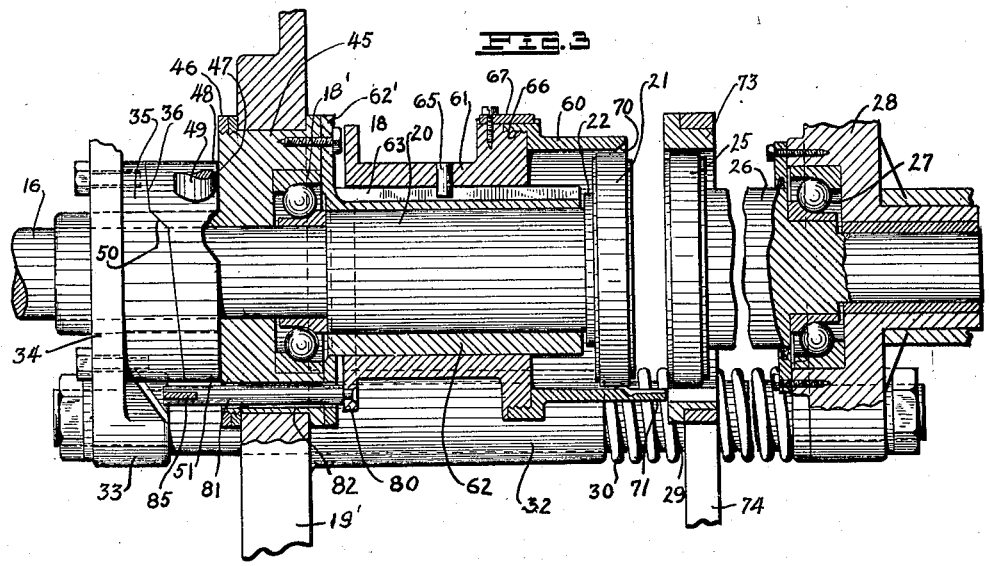
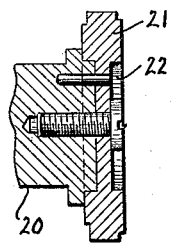
INVENTOR.
C.D. HELLYER
BY
ATTORNEY June 19, 1928.

C. D. HELLYER 1,674,286

CENTERING AND HOLDING DEVICE FOR METAL WORKING MACHINES

Filed Feb. 5, 1925 3 Sheets-Sheet 3

INVENTOR.
C.D. HELLYER

BY

ATTORNEY.

Patented June 19, 1928.

1,674,286

UNITED STATES PATENT OFFICE.

CLEMENT D. HELLYER, OF LOS ANGELES, CALIFORNIA.

CENTERING AND HOLDING DEVICE FOR METAL-WORKING MACHINES.

Application filed February 5, 1925. Serial No. 6,996.

This invention relates to a centering and holding device for metal working machines.

In the manufacture of oil grooved piston rings for gasoline engines, according to the common practice, the rings are placed in a cutting machine and the oil grooves are turned one at a time. With the best equipment with which I am familiar, so much time is consumed in placing and centering the rings accurately and cutting the grooves that the number of finished rings produced by a workman each day is relatively low. In working on the rings it is imperative that each ring be accurately centered since the slightest inaccuracy would result in a spoiled ring. The care required has, with the method and apparatus heretofore in use caused great delay in cutting the grooves.

To increase the number of rings turned out by each operator and at the same time to insure accurate cutting of the oil grooves is the purpose of my invention.

The general object of the invention, therefore, is to provide an improved machine for centering, holding and operating on piston rings.

One of the specific objects of the invention is to provide a machine in which a piston ring can be placed and wherein the operator by a simple operation will cause the ring to be accurately centered and gripped by the machine.

Another object of the invention is to provide an improved machine for centering piston rings wherein an improved gripping device for gripping the rings after they have been centered is employed.

An additional object of my invention is to provide a machine which will center one or more piston rings accurately after which the machine may be operated to cause it to grip and hold the rings in position so that the entire outer periphery of the ring is exposed for a cut by the operator.

Another object of the invention is to provide an improved gripping mechanism for piston rings which will hold the piston rings firmly in position with the entire outer periphery exposed for cutting.

A further object of the invention is to provide an improved means for centering and holding piston rings wherein the rings are centered by linear movement of a sleeve and are held by lateral pressure of two members, while the rings are acted upon by a cutter.

A further object of the invention is to provide an improved method for centering, holding, and cutting grooves in piston rings.

Figure 5:
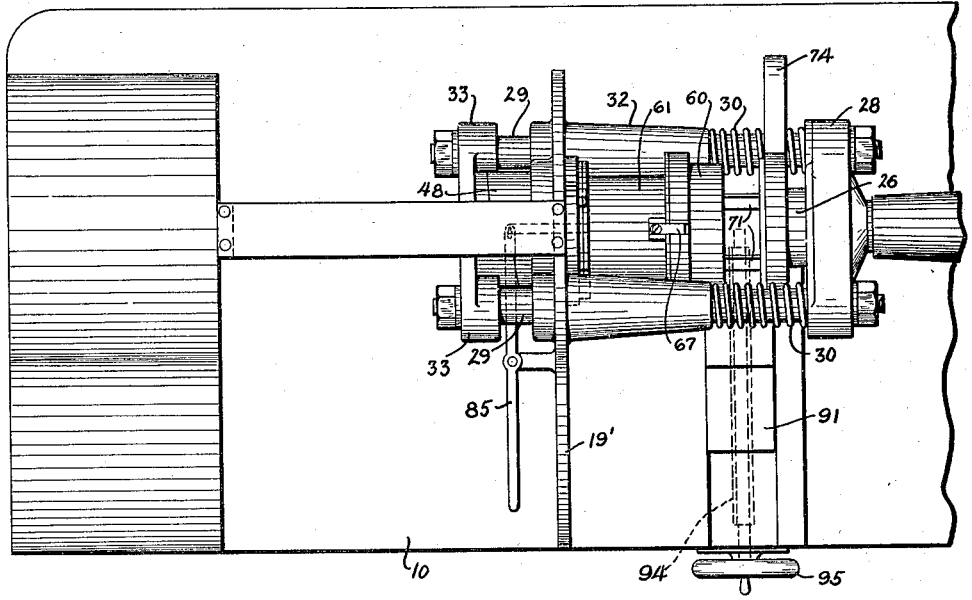

Other objects of the invention will be apparent from the following description taken in connection with the accompanying drawings wherein Fig. 1 is a side elevation partly in section showing my improved machine; Fig. 2 is an end view of the machine; Fig. 3 is a central sectional view showing the operating parts of the machine; Fig. 4 is a view similar to Fig. 3 showing the parts in another position; Fig. 5 is a top plan view of a portion of the machine; Fig. 6 is an elevation of the centering sleeve; Fig. 7 is a fragmentary elevation of the companion centering member and Fig. 8 is a sectional detail.

Referring to the drawing by reference characters, I have shown a bed for the machine at 10. This bed is provided at one end with a motor case 11 having a motor 12 therein. In the following description I will describe the device as directly operated from an electric motor but it will be understood that other driving means may be provided without departing from the spirit of my invention.

The motor 12 has a gear 14 mounted upon the armature shaft thereof. This gear meshes with another gear 15 shown as secured on a shaft 16. This shaft is provided at one end with a bearing 17 and with an intermediate bearing 18 supported on a plate 19. Adjacent the other end of the shaft, I provide another bearing 18' which is supported in a plate 19' on the bed 10. The bearing 18' is preferably a combined radial and thrust bearing so that the tangential pressure as well as a portion of the thrust may be taken by this bearing.

Adjacent one end of the shaft 16 an enlarged portion 20 is provided. Removably secured upon this enlarged portion 20 I show an interchangeable clamping plate 21. This clamping plate is provided with a recess 22 on each side which engages a flange on the end of the portion 20 while both faces of the clamping plate are provided with rabbeted portions 23.

Opposite the clamping plate 21, I provide a second clamping plate 25. This clamping plate 25 like the other plate is removably secured to a shaft 26 which is mounted in bearings 27 in a shiftable block 28. Like the bearings 18' the bearings 27 are preferably combined radial and thrust bearings to suit the requirements of the machine. The clamping plates 21 and 25 have their operative faces of the same diameter and a different clamping plate would be used for operating on different sized rings.

The block 28 is provided with two wings which are apertured to receive rods 29. These rods 29 are provided with springs 30. The rods pass through supports 32 and engage wings 33 on a second block 34.

The block 34 is secured to a cam member 35 which has a cam face 36 thereon. The cam member 35 is slidably mounted on the shaft 16 and may move therealong when desired.

The bearing 18' is shown as supported within a bushing 45 which engages the plate 19' arranged upon a bed 10. The bushing may be held in place by nuts 46 as shown. Adjacent the face 47 of the bushing 45 I show a second cam 48 which mates with the cam member 36. The cam 48 is free to turn about the axis of the shaft 16 and is provided with an operating lever 49 as shown.

The coacting cam faces are such that first a quick movement of the parts is provided by the cam portion 50, after which a slow motion and holding position is secured by the cam surfaces 51.

From the foregoing description it will be apparent that when the lever 49 is rocked from the position shown in Fig. 3 to the position shown in Fig. 4 that the rods 29 will move to the left in Fig. 3 compressing the springs 30 and moving the block 28 to the left. This movement of the block 28 moves the clamping plate 25 toward the clamping plate 21, thus bringing the piston rings R into position where they will be held as shown in Fig. 4.

It may be here mentioned that although in the embodiment of my invention shown I have illustrated my device as arranged to work on two rings simultaneously, it will be apparent, however, that I may operate upon one ring or upon two or more rings with equal facility without departure from the features of my invention.

In order that the rings R may be presented in proper position to be engaged by the clamping plate 25 I provide a centering sleeve shown at 60 in the accompanying drawings. This centering sleeve 60 is arranged upon a sliding collar 61 which is fitted about a bushing 62 arranged upon the enlarged portion 20 of the shaft 16. The bushing is provided with a flange 62' which may be secured to the bushing 45 as shown in order to prevent turning of the bushing. In order to prevent rotation of the collar 61 I provide a pin 65 upon the collar 61. This pin has movement in a slot 63 in the bushing 62.

To accommodate different sized rings the centering sleeve 60 may be removed and another of different size placed in position and for this purpose I preferably thread the sleeve as at 66. In order to prevent relative rotation between the collar 61 and the sleeve 60 I provide a key 67 which is fitted within aligned grooves in the sleeve 60 and collar 61.

The front face of the centering sleeve 60 is beveled as at 70 while the lower portion of the sleeve is provided with projecting spaced teeth 71 (shown in elevation in Fig. 8.) Upon these teeth I place the rings to be operated upon.

Arranged about the clamping plate 25 and coacting with the centering sleeve 60 I show a centering member 73 which is supported within a bracket 74 arranged upon the frame 10. The internal diameter of the member 73 is substantially the same as the internal diameter of the centering sleeve 60 and the member 73 like the centering sleeve 60 is removable and interchangeable to allow work to be done on different sized rings.

The centering member 73 acts as a stop against which the centering sleeve 60 presses the open ring.

The centering sleeve 60 is mounted to move toward the centering member 73 and as it moves the beveled face 70 on the sleeve 60 forces the piston ring closed and also centers it so that the axis of the ring coincides with the axis of the sleeve 60 and with the axis of the member 73. This allows the ring to move within the sleeve 60 as shown in Fig. 4.

In order to provide movement for the centering sleeve 60 I provide a flange 80 upon one end of the collar 61. Upon this flange 80 I secure a rod 81 which passes through an aperture 82 in the bushing 46. The rod 81 engages at one end an operating member 85 which is pivoted at 86 upon a support 87. As the operating lever 85 is moved to the left in Fig. 1 the collar 61 together with the sleeve 60 will move to the right thereby moving the collar 61 and the sleeve 60.

A cutting tool may be provided as at 90. This cutting tool may be of any desired character and may be secured in a sliding holding member 91 which is provided with a threaded portion 92 shown as driven by a screw 94 by an operating wheel 95.

In operating my device, the operator first places the desired number of piston rings upon the projecting portions 71 of the sleeve 61. The operating lever 85 is then moved to the left from the position shown in Fig. 5. This action causes the centering sleeve 60 to move over the piston rings forcing them first against the companion centering member 73 after which the beveled surface 70 causes the rings to be closed, centered, and to pass within the centering sleeve 60.

When this operation is complete and while the centering sleeve is in the centering position, the arm 49 is rocked causing the cam surface 50 and 51 to quickly pull the rods 29 so that the block 28 is actuated and the clamping plate 25 is moved to the left in Fig. 3 thereby forcing the centered piston rings R against the clamping plate 21. Further movement of the lever 40 allows the cam surfaces 51 to engage to lock the piston rings R in the position shown in Fig. 4. After this is done the operator rocks the lever 85 to move the centering sleeve from engagement with the rings R so that the cutting tool 90 may be operated by means of the hand wheel 95. After the oil grooves have been cut the tool 90 is removed by reversing the direction of rotation of the hand wheel 95.

Having thus described my invention, I claim:

1. In a machine of the class described, a bed, a shiftable centering sleeve movable on said bed, said sleeve having an internal diameter equal to the outer diameter of the ring, means to move said sleeve to engage the outer periphery of and to center a piston ring, a pair of clamping plates adapted to engage the faces of said piston ring to hold it in centered position, said clamping plates including mechanism for imparting a rotary movement to said piston rings, means to cut a groove in said ring, and means to release said ring.

2. In a centering device, a support, a sleeve slidably mounted on said support, said sleeve having a bevelled face to engage a piston ring, said sleeve having a fixed inside diameter substantially equal to the outside diameter of the piston ring and means coacting with said sleeve to force a piston ring within said sleeve.

3. In a machine of the class described, a bed, a hollow shiftable centering member mounted on said bed, means to move said member to engage the outer periphery of and to center a piston ring, holding devices mounted on said bed, one of said devices being movable thereon, said devices being adapted to engage the faces of said piston ring to hold it in centered position, said holding devices including mechanism for imparting a rotary movement to said piston rings.

4. In a device of the class described, a supporting shaft, a pair of centering members coaxial with said shaft, one of said members being mounted upon the shaft for movement along the shaft toward the other centering member, a pair of holding members, one of said holding members being movable toward the other holding member, each of said holding members and each of said centering members being normally spaced apart, and means to operate said members.

5. In a centering device, a support, a hollow sleeve mounted on said support, said sleeve having an inclined face on one end thereof adapted to engage a piston ring, said sleeve having an inside diameter substantially equal to the outside diameter of the piston ring and means coacting with said sleeve to force the piston ring within said sleeve.

6. In a piston ring cutting machine, means for centering a piston ring and means for holding a piston ring, said centering means including a non-rotatable sleeve mounted for linear movement on said machine, said sleeve having a bevelled end thereon, a companion member adapted to coact with said sleeve to center a piston ring, said holding means comprising a pair of opposed clamping plates, said plates being associated with said centering means and being adapted to be brought toward each other to engage a piston ring held centered in said centering means.

7. In a device of the class described, a pair of centering members, one of said members being fixed and the other centering member being mounted for movement toward the fixed centering member, a pair of holding members, one of said holding members being fixed and the other holding member being movable toward the fixed holding member, said holding members and said centering members being coaxially arranged and normally spaced apart, means to move the movable centering member in one direction and means to move the movable holding member in an opposite direction.

8. A metal working machine comprising a base, means on said base adapted to engage the outer periphery of and to center a piston ring, a clamping plate rotatably mounted on said base, said clamping plate having means thereon for engaging a piston ring, a block slidably mounted upon said base, a second block held in spaced relation to the first block, a clamping plate supported on said second block, means to hold said clamping plates in spaced relation, and means to move one of said clamping plates toward the other.

9. A machine for centering and cutting piston rings, said machine comprising a centering mechanism and a holding mechanism, said centering mechanism including a slidable centering member including a body part having a removable tubular piston ring engaging member therein, means to force a piston ring within said tubular member, said holding mechanism comprising two relatively movable clamping plates, means to move said ring engaging member to bring a piston ring against one of said relatively movable clamping plates, each of said relatively movable clamping plates being removable, said clamping plates being adapted to engage the ring held against one of the clamping plates by the centering member and means to move one of said clamping plates.

10. A metal working machine comprising a base, a hollow centering device, means to force a piston ring within said hollow centering device, a shaft, a clamping plate associated with said shaft, an auxiliary shaft mounted on said base, said auxiliary shaft having a clamping plate associated therewith, means to move one of said clamping plates toward the other, means to rotate one of said clamping plates, said first mentioned means operating independent of the second mentioned means.

11. A metal working machine comprising a base, means mounted on said base to center a piston ring, a support, a clamping plate upon said support, said clamping plate having a portion thereon for engaging a piston ring, a block slidably mounted upon said base, said block having a pair of rods secured thereto, a second block held on said rods in spaced relation to the first block, said second mentioned block having a bearing thereon and having an auxiliary shaft mounted in said bearing, said auxiliary shaft having a clamping plate thereon, means on said rods to hold said clamping plates in spaced relation, and means to move one of said clamping plates toward the other.

12. A metal working machine comprising a base, a shaft mounted on said base, a clamping plate removably secured on said shaft, said clamping plate having means thereon for engaging a piston ring, a block slidably mounted upon said shaft, said block having a pair of rods secured thereto, a second block held on said rods in spaced relation to the first block, an auxiliary shaft mounted on said second mentioned block, said auxiliary shaft having a clamping plate thereon, means on said rods to hold said clamping plates in spaced relation, and means to move one of said clamping plates relative to the other clamping plate.

13. A metal working machine comprising a base, a shaft mounted on said base, a centering sleeve mounted to slide along said shaft, a coacting centering device mounted on said base, means to actuate said centering sleeve, a clamping plate rotatably mounted on said base, said clamping plate having means thereon for engaging a piston ring, a pair of spaced blocks mounted upon said base, a second clamping plate on one of said blocks, and means to move one of said clamping plates toward the other.

14. A metal working machine comprising a base, a slidably mounted centering sleeve, said sleeve comprising a tubular body, a coacting centering member adapted to coact with said centering sleeve to center a ring, a shaft, a clamping plate secured upon said shaft, said clamping plate having a portion thereon for engaging a piston ring, a block slidably mounted upon said shaft, said block having a pair of rods secured thereto, a second block held on said rods in spaced relation to the first block, said second mentioned block having a bearing thereon and having an auxiliary shaft mounted in said bearing, said auxiliary shaft having a clamping plate removably secured thereto, means on said rods to normally hold said clamping plates in spaced relation, and means to move one of said clamping plates toward the other.

15. A metal working machine comprising a base, a shaft mounted thereon, a slidably mounted collar about said shaft, a centering sleeve on said collar, said sleeve comprising a hollow body, a companion centering member adapted to coact with the end of said centering sleeve to center a ring, means to move said collar and said sleeve along said shaft, a clamping plate secured upon said shaft, said clamping plate having a portion thereon for engaging a piston ring, a block slidably mounted upon said shaft, said block having a pair of rods secured thereto, a second block held on said rods in spaced relation to the first block, said second mentioned block having a bearing thereon and having an auxiliary shaft mounted in said bearing, said auxiliary shaft having a clamping plate removably secured thereto, means on said rods to normally hold said clamping plates in spaced relation, and means to move one of said clamping plates toward the other.

16. A metal working machine comprising a base, a shaft mounted on said base, means to rotate said shaft, a bushing mounted upon said shaft, said bushing being fixed against rotation, a collar slidably mounted on said bushing, a centering sleeve mounted on said collar, said sleeve comprising a hollow tubular body having a bevelled outer end, a bracket mounted on said base, said bracket having a centering member therein, said centering member being adapted to coact with the bevelled end of said centering sleeve to center a ring, means to move said collar and said centering sleeve along said shaft, said means including a rod secured to said collar, an operating lever adapted to coact with said rod, a clamping plate secured upon one end of said shaft, said clamping plate having a rabbeted portion thereon for engaging a piston ring, a block slidably mounted upon said shaft, said block having a pair of rods secured thereto, a second block secured to said rod in spaced relation to the first block, said second mentioned block having a bearing thereon and having an auxiliary shaft mounted in said bearing, said auxiliary shaft having a clamping plate removably secured thereto, spring means on said rods to normally hold said clamping plates in spaced relation, means to move one of said clamping plates toward the other, said means comprising a cam member fixed on one of said blocks and a second cam member rotatably mounted on said shaft, and means to rock the second cam member to simultaneously move the two blocks with the rods thereon to thereby move the clamping plates relative to each other to bring them into position to engage a piston ring.

17. In a centering and holding device, a support, a pair of clamping members, a shiftable centering sleeve on said support, means on said sleeve to engage a piston ring, said sleeve having an inclined face thereon, said sleeve having an inside diameter substantially equal to the outside diameter of the ring, means to move said sleeve over said clamping members, means whereby said movement centers said ring, means to move one of said clamping members toward the other clamping member, and means to hold said members in gripping engagement with the ring.

In testimony whereof, I hereunto affix my signature.

CLEMENT D. HELLYER.